United States Patent
Hofmann et al.

(10) Patent No.: US 11,020,891 B2
(45) Date of Patent: Jun. 1, 2021

(54) DEVICE FOR PRODUCING PLASTIC PIPES

(71) Applicant: Unicor GmbH, Hassfurt (DE)

(72) Inventors: Günther Hofmann, Hassfurt-Augsfeld (DE); Gerhard Neubauer, Königsberg-Römershofen (DE)

(73) Assignee: Unicor GmbH (*) Notice: Subject to any disclaimer, the term of this patent is extended or adjusted under 35 U.S.C. 154(b) by 0 days.

(21) Appl. No.: 15/760,814

(22) PCT Filed: Sep. 19, 2016

(86) PCT No.: PCT/EP2016/072206
§ 371 (c)(1),
(2) Date: Mar. 16, 2018

(87) PCT Pub. No.: WO2017/046421
PCT Pub. Date: Mar. 23, 2017

(65) Prior Publication Data
US 2019/0248056 A1 Aug. 15, 2019

(30) Foreign Application Priority Data
Sep. 18, 2015 (DE) .................. DE10 2015 115 828

(51) Int. Cl.
B29C 49/00 (2006.01)
B29C 48/25 (2019.01)
(Continued)

(52) U.S. Cl.
CPC .......... B29C 48/2566 (2019.02); B29C 48/09 (2019.02); B29C 48/13 (2019.02);
(Continued)

(58) Field of Classification Search
CPC .................................. B29C 49/0021
See application file for complete search history.

(56) References Cited

U.S. PATENT DOCUMENTS 4,021,178 A * 5/1977 Braun ................ B29C 49/0021
425/325
4,449,910 A * 5/1984 Leloux ............... B29C 49/0021
425/325
(Continued)

FOREIGN PATENT DOCUMENTS

DE 3930318 C1 5/1990
DE 10058889 A1 6/2002
(Continued)

OTHER PUBLICATIONS

German Examination Report for DE Patent Application No. 102015115828.0, dated Jun. 16, 2016. Machine Generated Translation is attached.

(Continued)

Primary Examiner — Timothy Kennedy
Assistant Examiner — Alexander A Wang
(74) Attorney, Agent, or Firm — Lerner, David, Littenberg, Krumholz & Mentlik, LLP

(57) ABSTRACT

A device for producing plastic pipes may include an extruder with a die head and a corrugator, into which a molten plastic tube is introduced by means of the die head to mold the plastic pipe, wherein the corrugator has a molding section, in which molding jaws are guided in pairs in the production direction. In an inlet section of the corrugator, the molding jaws are brought together to form molding jaw pairs towards the start of the molding section, and in an outlet section of the corrugator, the molding jaw pairs are moved apart from each other from the end of the molding section. The guiding apparatus has a guide and/or temperature-control element apparatus having a temperature-control medium channel apparatus through which temperature-control medium can flow, and a guide and/or temperature-control surface appa- (Continued)

Figure 1:
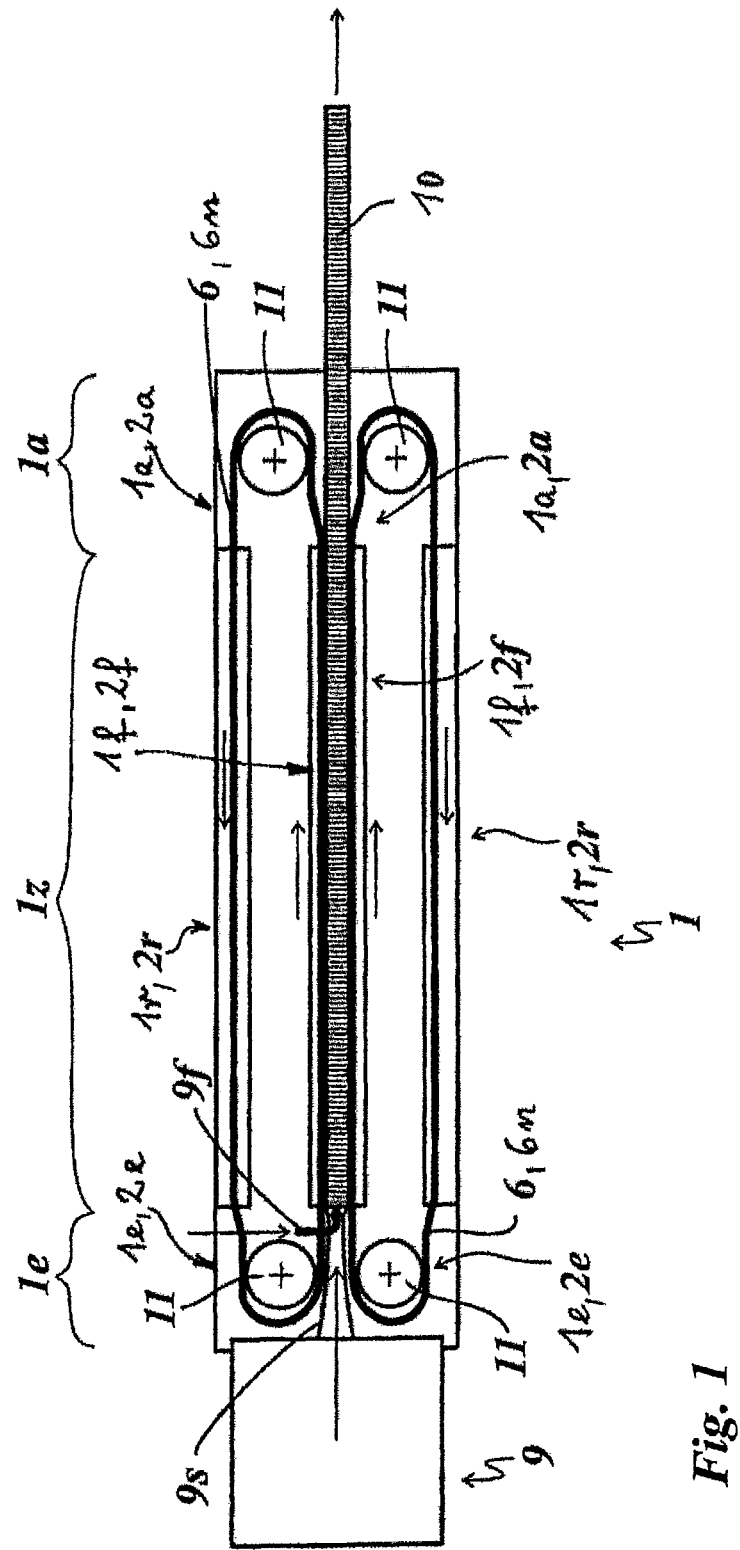

ratus, which faces the outer side of the molding jaws passing through, transferring heat.

27 Claims, 11 Drawing Sheets

(51) Int. Cl.
    *B29C 48/30*      (2019.01)
    *B29C 48/88*      (2019.01)
    *B29C 48/09*      (2019.01)
    *B29C 48/13*      (2019.01)
    *B29C 48/00*      (2019.01)
    *B29C 48/87*      (2019.01)
    *B29L 23/18*      (2006.01)
    *B29L 23/00*      (2006.01)

(52) U.S. Cl.
    CPC ........ *B29C 48/3001* (2019.02); *B29C 48/303* (2019.02); *B29C 48/9115* (2019.02); *B29C 48/0011* (2019.02); *B29C 48/87* (2019.02); *B29C 49/0021* (2013.01); *B29L 2023/18* (2013.01); *B29L 2023/22* (2013.01)

(56) References Cited

U.S. PATENT DOCUMENTS

| | | | | |
|---|---|---|---|---|
| 5,141,427 | A | * | 8/1992 | Hegler ................ B29C 49/0021 425/233 |
| 5,164,204 | A | | 11/1992 | Weppert et al. |
| 5,545,369 | A | * | 8/1996 | Lupke ..................... B29C 33/26 264/508 |
| 5,773,044 | A | * | 6/1998 | Dietrich .............. B29C 49/0021 425/113 |
| 7,153,117 | B2 | | 12/2006 | Hofmann |
| 7,172,402 | B2 | | 2/2007 | Hofmann |
| 2004/0032051 | A1 | | 2/2004 | Schulte |
| 2009/0091055 | A1 | * | 4/2009 | Hegler ................ B29C 49/0021 264/209.2 |

FOREIGN PATENT DOCUMENTS

| | | |
|---|---|---|
| DE | 10257363 C1 | 10/2003 |
| DE | 102008021237 A1 | 10/2009 |
| DE | 102008023178 A1 | 11/2009 |
| EP | 0087854 A1 | 9/1983 |
| EP | 1897671 A1 | 3/2008 |
| FR | 2430837 A1 | 2/1980 |
| WO | 2004052624 A1 | 6/2004 |

OTHER PUBLICATIONS

International Search Report for PCT EP Application No. 2016072206, dated Jan. 4, 2017.

* cited by examiner

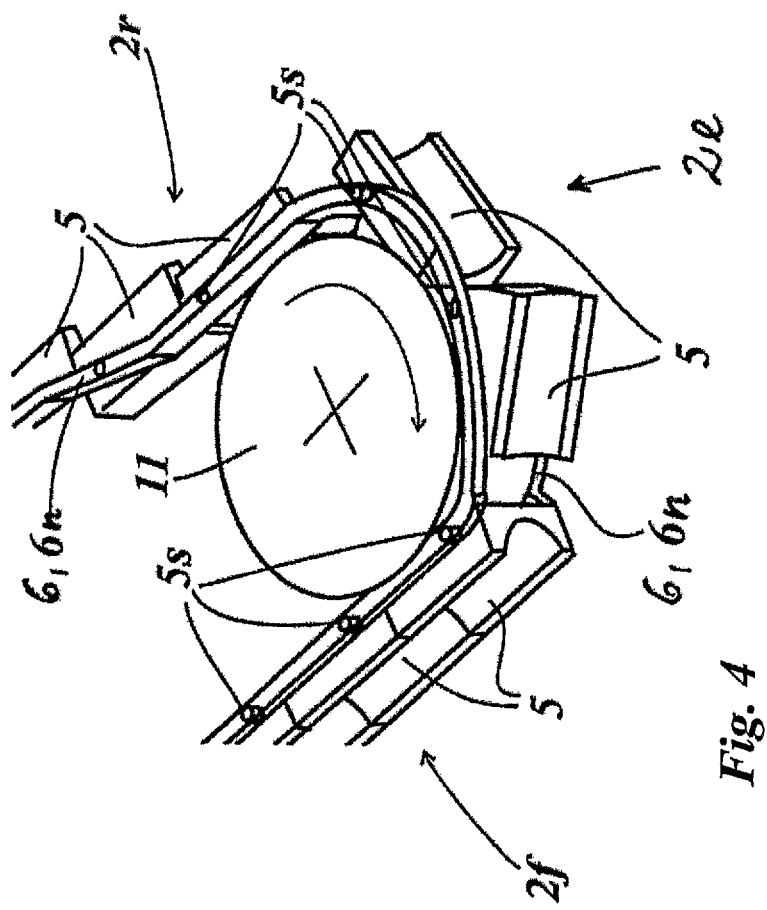
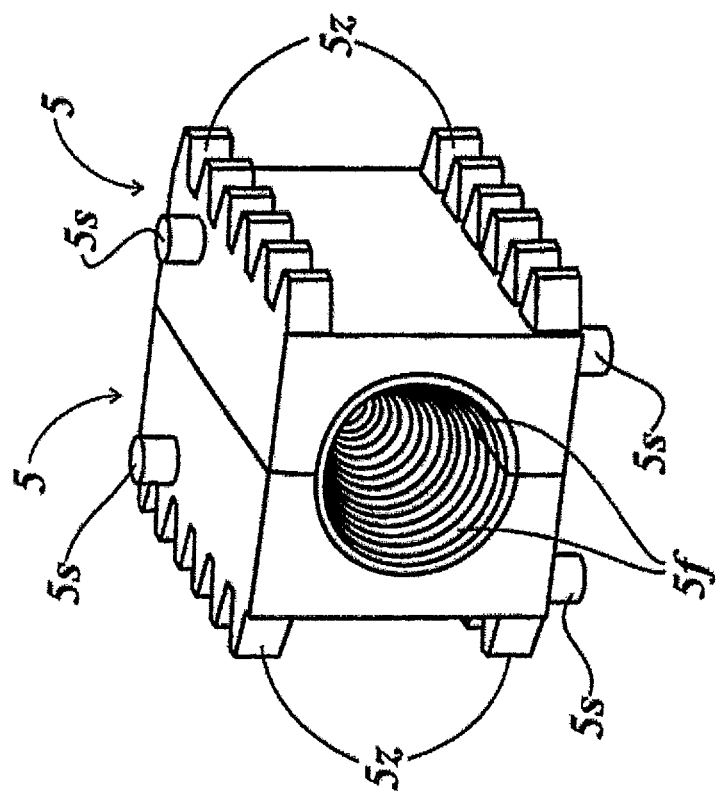
Fig. 4
Fig. 3

DEVICE FOR PRODUCING PLASTIC PIPES

CROSS REFERENCE TO RELATED APPLICATIONS

The present application is a national phase entry under 35 U.S.C. § 371 of International Application No. PCT/EP2016/072206 filed Sep. 19, 2016, which claims the priority from German Patent Application No. 10 2015 115 828.0, filed on Sep. 18, 2015, the entire contents of which are hereby incorporated by reference.

The invention relates to a device for producing plastic pipes according to the preamble of claim 1.

Such a device for producing plastic pipes is described e.g. in WO 2004/052 624 A1. The device has an extruder with a die head, and a corrugator, into which a molten plastic tube is introduced by means of the die head in order to mold the plastic pipe. The corrugator has a molding section, in which molding jaws are guided in pairs in the production direction. In an inlet section of the corrugator, the molding jaws are brought together to form molding jaw pairs towards the start of the molding section. In an outlet section of the corrugator, the molding jaw pairs are moved apart from each other from the end of the molding section. In an intermediate section of the corrugator arranged between the inlet section and the outlet section, the molding section is formed to guide the molding jaw pairs and a return guide is formed in which the molding jaws are returned from the end of the molding section to the start of the molding section. From this published document and from DE 102 57 363 C1, it is already known that a cooling channel is formed in the molding jaw halves in order to cool the molding surfaces, wherein each molding jaw half has a cooling medium feed and a cooling medium discharge, which open on the base surface of the molding jaw halves.

The object of the present invention is to create a device of the above-named type which is improved with respect to the temperature control of the molding jaws.

According to the invention this object is achieved with the subject-matter of claim 1. The basic concept of the invention is to create a fixed guide and/or temperature-control apparatus which interacts with the molding jaws. The subject-matter of claim 1 is a device for producing plastic pipes. It has an extruder with a die head, and a corrugator into which a molten plastic tube is introduced by means of the die head in order to mold the plastic pipe. The device provides that the corrugator has a molding section, in which molding jaws are guided in pairs in the production direction. The device furthermore provides that, in an inlet section of the corrugator, the molding jaws are brought together to form molding jaw pairs towards the start of the molding section. Further, the device provides that, in an outlet section of the corrugator, the molding jaw pairs are moved apart from each other from the end of the molding section, and that, in an intermediate section of the corrugator arranged between the inlet section and the outlet section, the molding section is formed to guide the molding jaw pairs and a return guide is formed in which the molding jaws are returned from the end of the molding section to the start of the molding section.

The device provides a stationary guiding apparatus for guiding the molding jaws. In the solution according to the invention, it is important a) that the guiding apparatus has a fixed guide and/or temperature-control element apparatus, b) that the guide and/or temperature-control element apparatus has a temperature-control medium channel apparatus through which temperature-control medium can flow, c) that the guide and/or temperature-control element apparatus has a guide and/or temperature-control surface apparatus, which faces the outer side of the molding jaws passing through, transferring heat, d) that, in the guide and/or temperature-control surface apparatus of the guide and/or temperature-control element apparatus, guide recesses having elevations and/or depressions and/or flat guide surfaces are formed which interact with corresponding guide recesses and/or guide surfaces of the molding jaws passing through.

A preferably fluid temperature-control medium flows through the temperature-control medium channel apparatus, whereby the preferably fixed guide and/or temperature-control element apparatus achieves a predetermined temperature and temperature distribution. The molding jaws which pass through the guide and/or temperature-control element apparatus are temperature-controlled in such a way that the molding surfaces of the molding jaws achieve the sought temperature and preferably constant temperature distribution over the molding surface.

A particularly advantageous temperature control by means of the temperature-control medium is possible with embodiments which provide that the guide and/or temperature-control medium channel apparatus has parallel temperature-control medium channels which extend through the guide and/or temperature-control element apparatus.

With regard to the temperature-control medium channel apparatus, it can also be provided that the guide and/or temperature-control medium channel apparatus is arranged and designed in the guide and/or temperature-control element apparatus in such a way that the molding surface of the molding jaws and/or molding jaw pairs passing through achieves a uniform temperature distribution over the entire molding surface.

A particularly effective guidance of the molding jaws is achieved if it is provided that the guide formations, having elevations and/or depressions, of the guide and/or temperature-control element apparatuses are preferably formed as guide pins and/or guide lugs and/or are formed as guide depressions, preferably guide grooves; and that the guide formations, having elevations and/or depressions, of the molding jaws are guide formations of the guide and/or temperature-control element apparatus.

A particularly compact structure with optimized heat transfer and guidance is achieved with embodiments which provide that the guide and/or temperature-control element apparatus is formed such that the molding jaw pairs passing through in the molding section and/or the molding jaws passing through in the return guide are at least partially covered on their outer side, wherein the molding jaw pairs or the molding jaws preferably slide along flat against the guide and/or temperature-control element apparatus. In a preferred development, it can be provided that the guide and/or temperature-control element apparatus is arranged in the molding section on the upper outer side of the molding jaw pairs passing through and on the lower outer side of the molding jaw pairs passing through and on one lateral outer side and on the other lateral outer side of the molding jaw pairs passing through, and thereby covers the molding jaw pairs passing through on four longitudinal sides. With regard to the return guide, it can also be provided that the guide and/or temperature-control element apparatus is arranged in the return guide of the molding jaws on the upper outer side of the molding jaws and on the lower outer side of the molding jaws and is arranged on the lateral outer side of the molding jaws which is arranged facing away from the molding surface of the respective molding jaws, i.e. covers the molding jaws only on three sides.

It can be provided that the guide and/or temperature-control element apparatus is formed from several guide and/or temperature-control elements, which surround the molding jaw pairs passing through on several sides.

It can be provided that a guide and/or temperature-control element is arranged on the upper outer side of the molding jaw pairs passing through in the molding section, and/or that at least one guide and/or temperature-control element is arranged on the lower outer side of the molding jaw pairs passing through in the molding section, and/or that a guide and/or temperature-control element is arranged on one lateral outer side of the molding jaw pairs passing through in the molding section, and/or that a guide and/or temperature-control element is arranged on the other outer side of the molding jaw pairs passing through in the molding section.

A practicable structure of the guide and/or temperature-control element apparatus is achieved if it is provided that the guide and/or temperature-control element apparatus is formed from several guide and/or temperature-control elements arranged axially one behind another edge to edge in the guiding direction and/or is formed from several guide and/or temperature-control elements arranged next to each other transverse to the guiding direction. In a preferred development, it can be provided that each guide and/or temperature-control element respectively has a guide and/or temperature-control surface on the side facing the molding jaws passing through and/or the molding jaw pairs passing through.

In terms of an effective guidance of the molding jaws and molding jaw pairs passing through against or in the guide and/or temperature-control element apparatus, it can be provided that the guide and/or temperature-control surface of the guide and/or temperature-control elements has guide formations which are formed as guide elevations and/or guide depressions.

It can be provided that the guide elevations on the molding jaws are formed as guide pins and the guide depressions on the guide and/or temperature-control elements are formed as guide grooves, in which the guide pins engage.

It can be provided that the guide elevations and/or guide depressions are formed in the area between two temperature-control elements neighboring each other in the transverse direction.

It can be provided that in each case at least one temperature-control medium channel is formed in each guide and/or temperature-control element of the guide and/or temperature-control element apparatus. In a preferred development, it can be provided that several parallel temperature-control medium channels are formed in the guide and/or temperature-control element.

In terms of an optimization of the temperature control, in preferred embodiments it can be provided that, over its axial course, the temperature-control medium channel has a constant cross section or has a varying cross section.

In order to control the temperature of axially neighboring guide and/or temperature-control elements in particular with the same temperature-control medium circuit, it can be provided that axially neighboring guide and/or temperature-control elements are arranged edge to edge and have a coupling apparatus, which has a connecting channel for temperature-control medium, by means of which the at least one temperature-control medium channel of one guide and/or temperature-control element can be connected to the at least one temperature-control medium channel of the other temperature-control element. In a preferred development, it can be provided that the coupling apparatus is formed as a plate-shaped body, in which the connecting channel for temperature-control medium is formed.

It can be provided that, in the area of a guide and/or temperature-control element, a vacuum apparatus or a part of a vacuum apparatus is arranged, which is or can be connected to an external vacuum supply, and is formed on a connection apparatus of a vacuum channel apparatus formed in the molding jaw, which applies a vacuum to the molding surface of the molding jaw guided in the molding section.

In a preferred development, it can be provided that the vacuum apparatus or the part of the vacuum apparatus is formed engaging through the guide and/or temperature-control element and/or is formed inside a guide and/or temperature-control element and/or is formed in an intermediate space between two adjoining guide and/or temperature-control elements and/or is formed adjoining a guide and/or temperature-control element.

Figure 2:
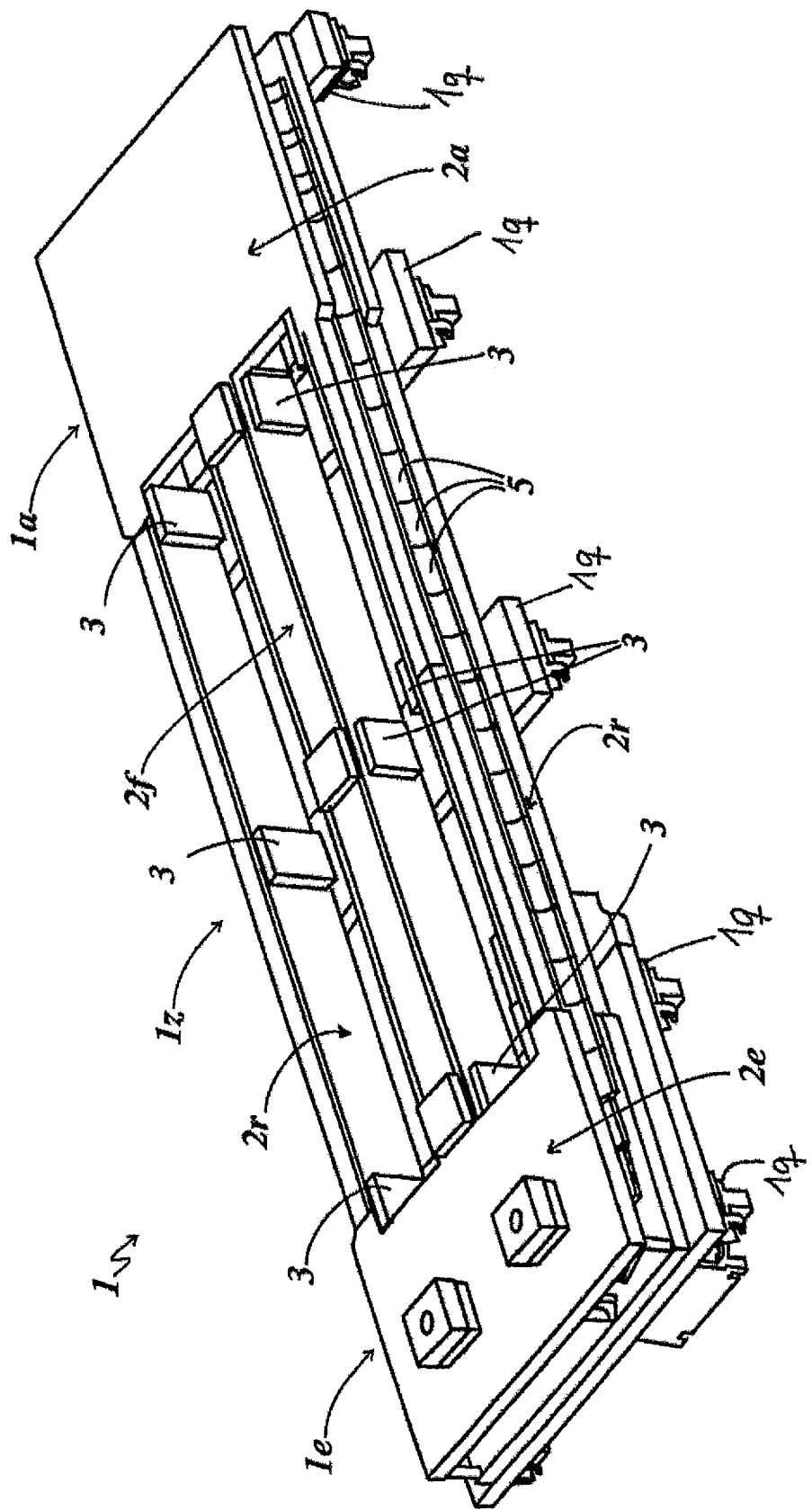
Figure 5:
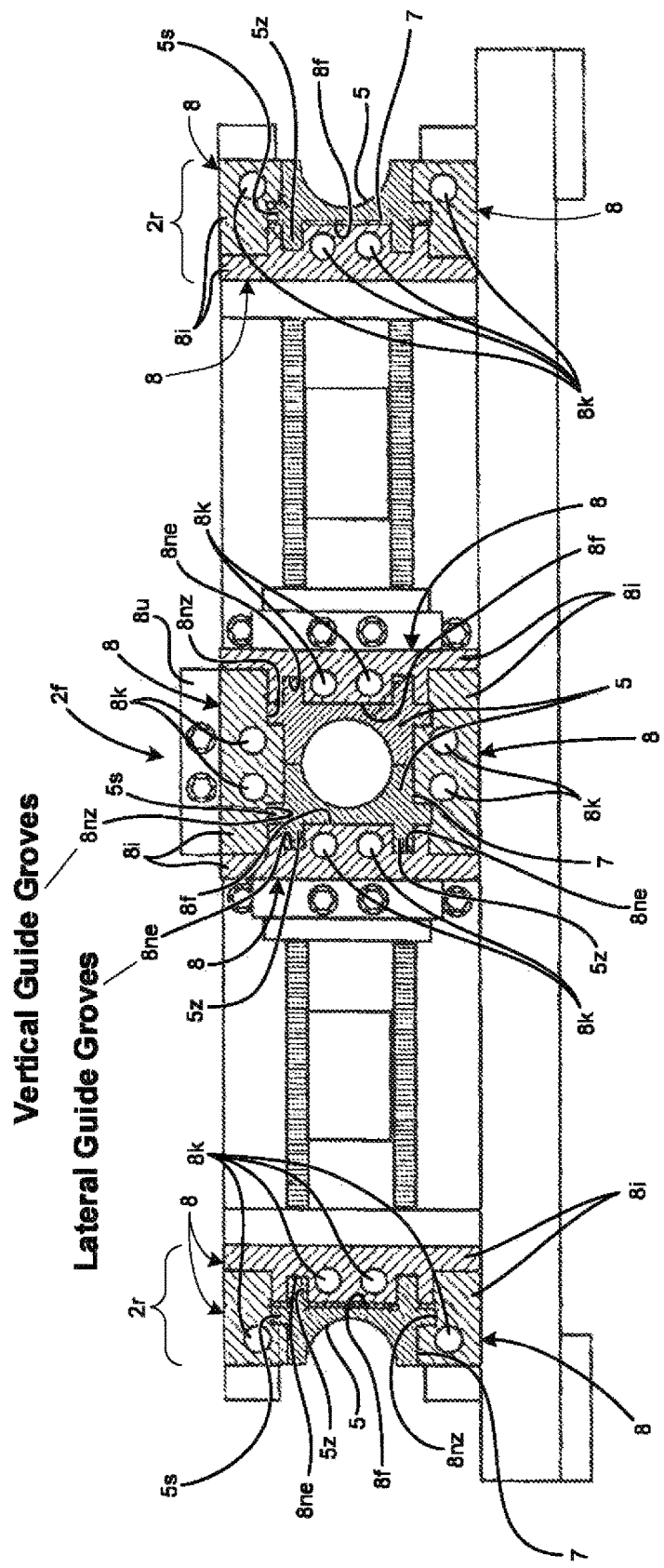
Figure 6:
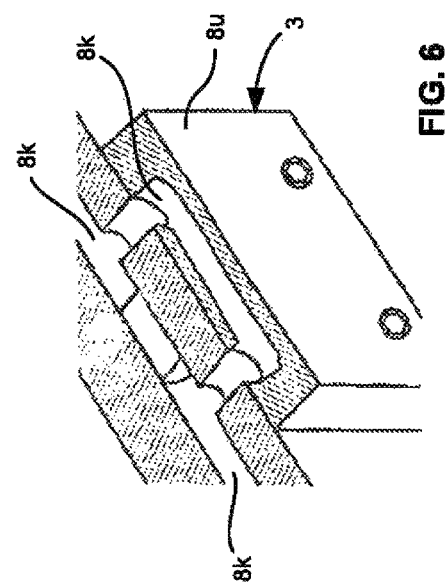
Figure 7:
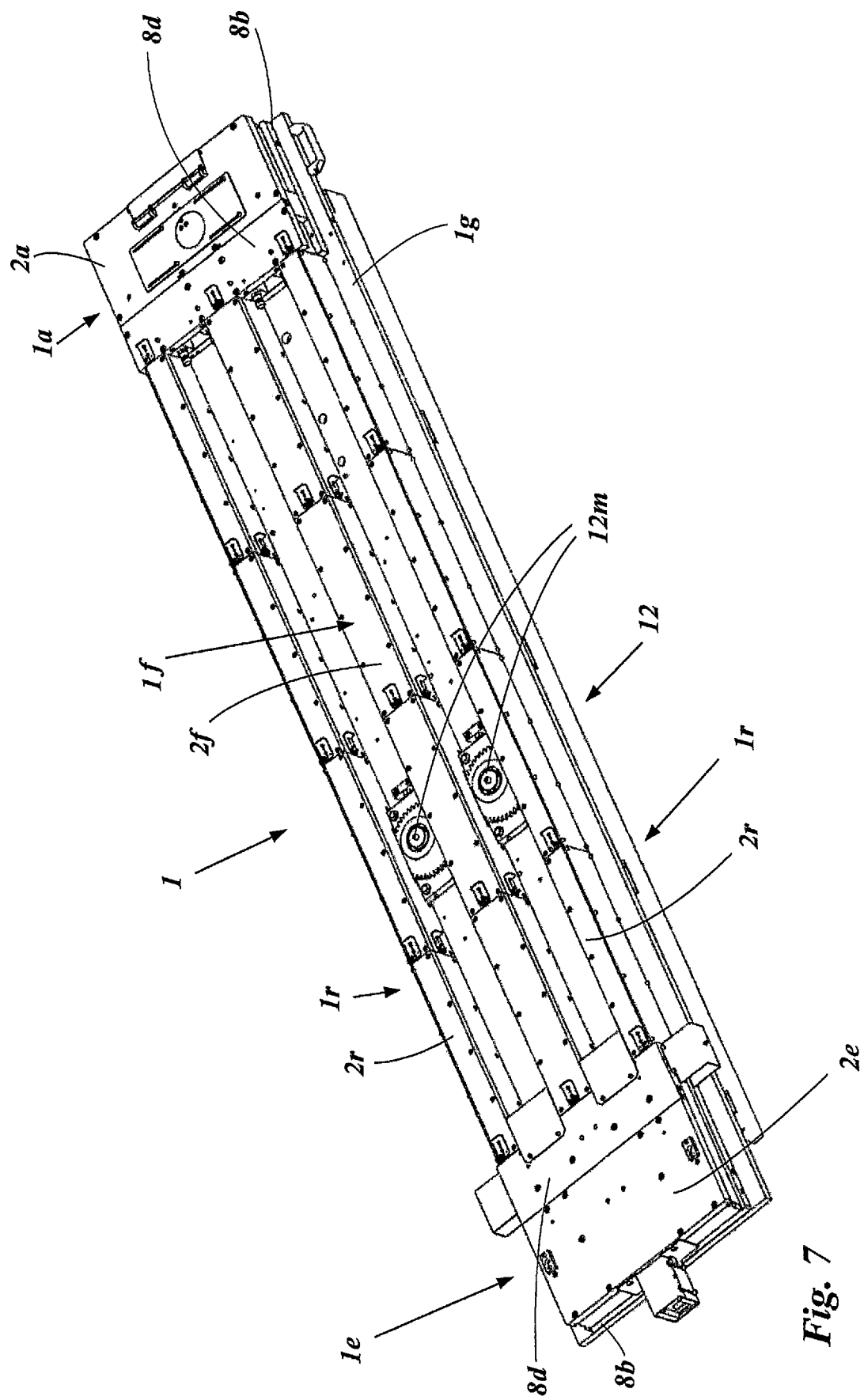
Figure 8:
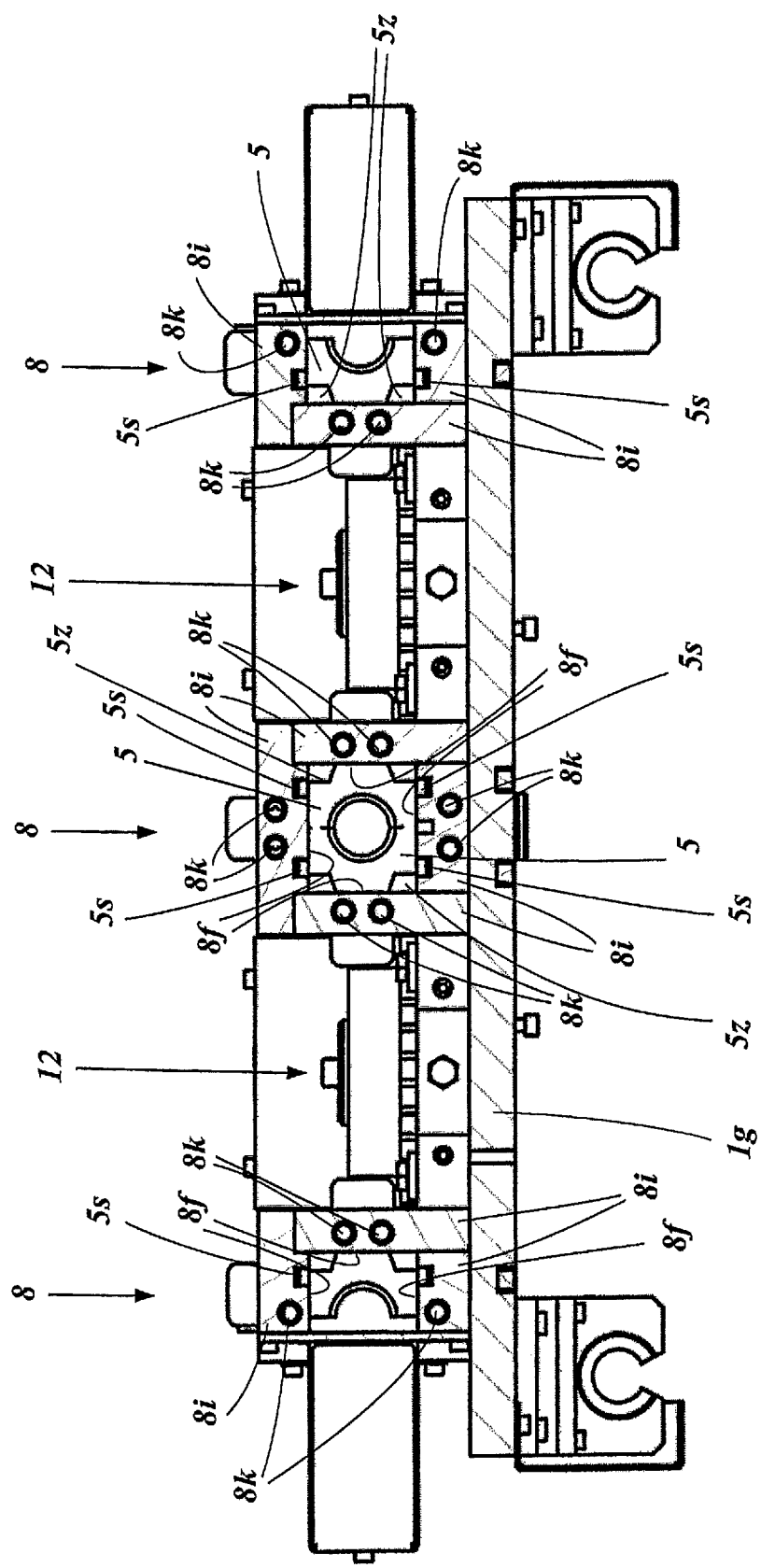
Figure 9:
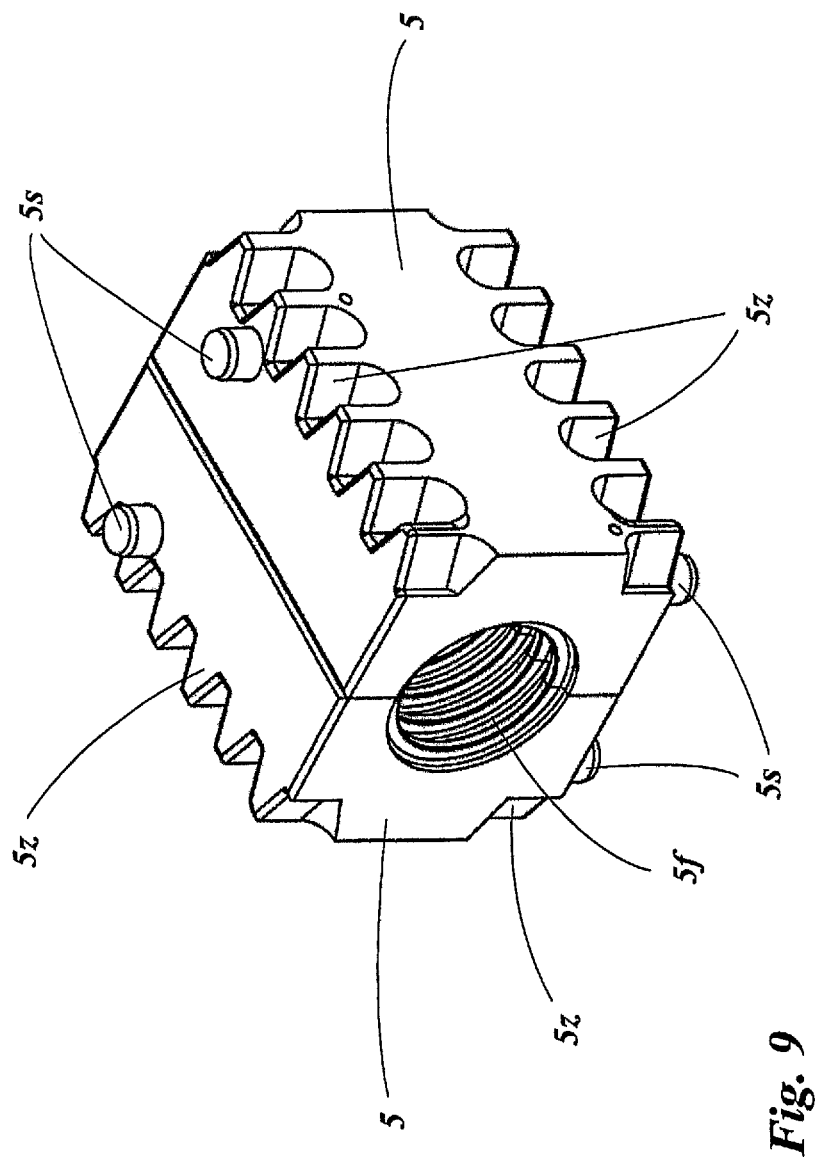
Figure 10:
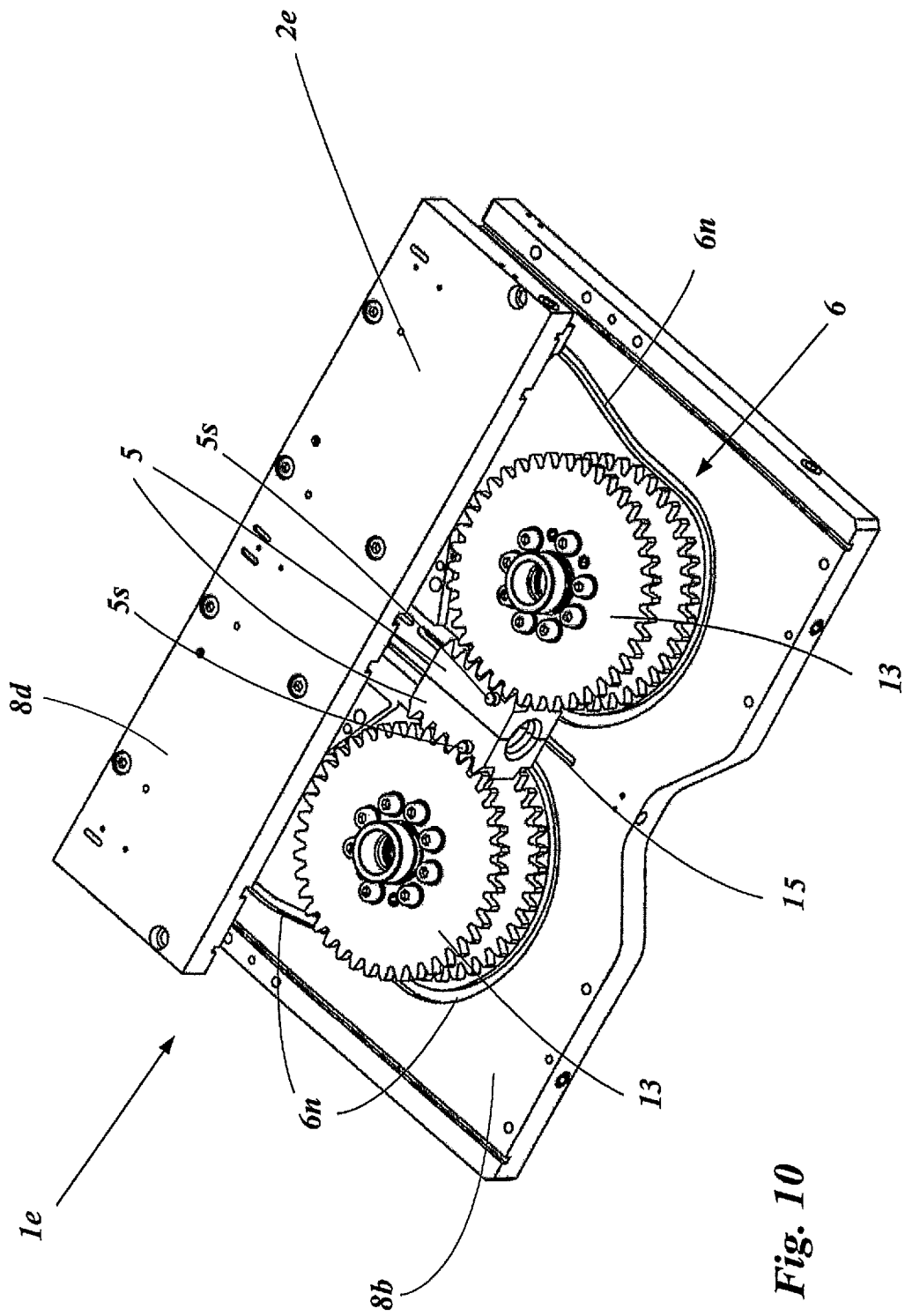
Figure 11:
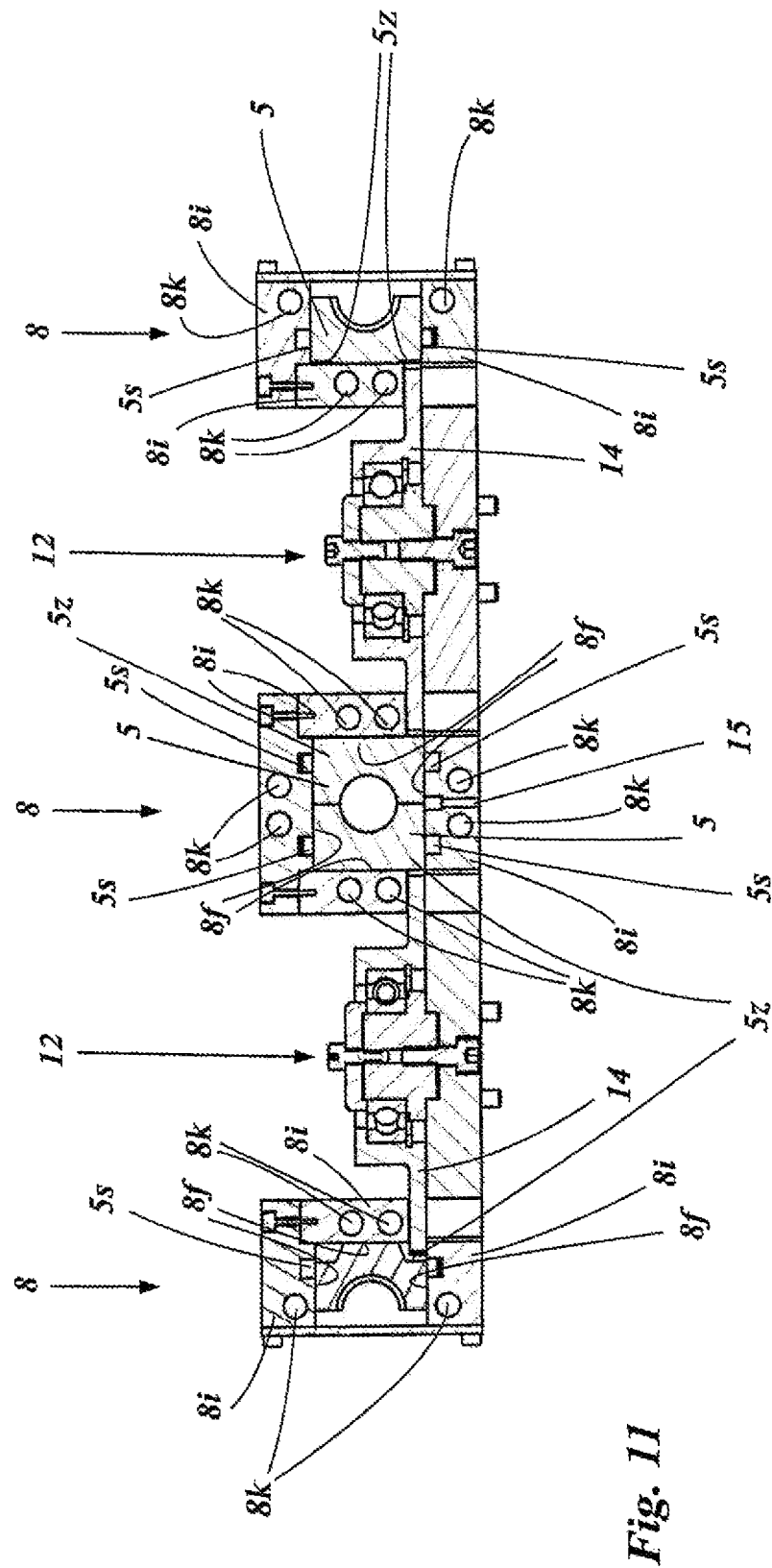
Figure 12:
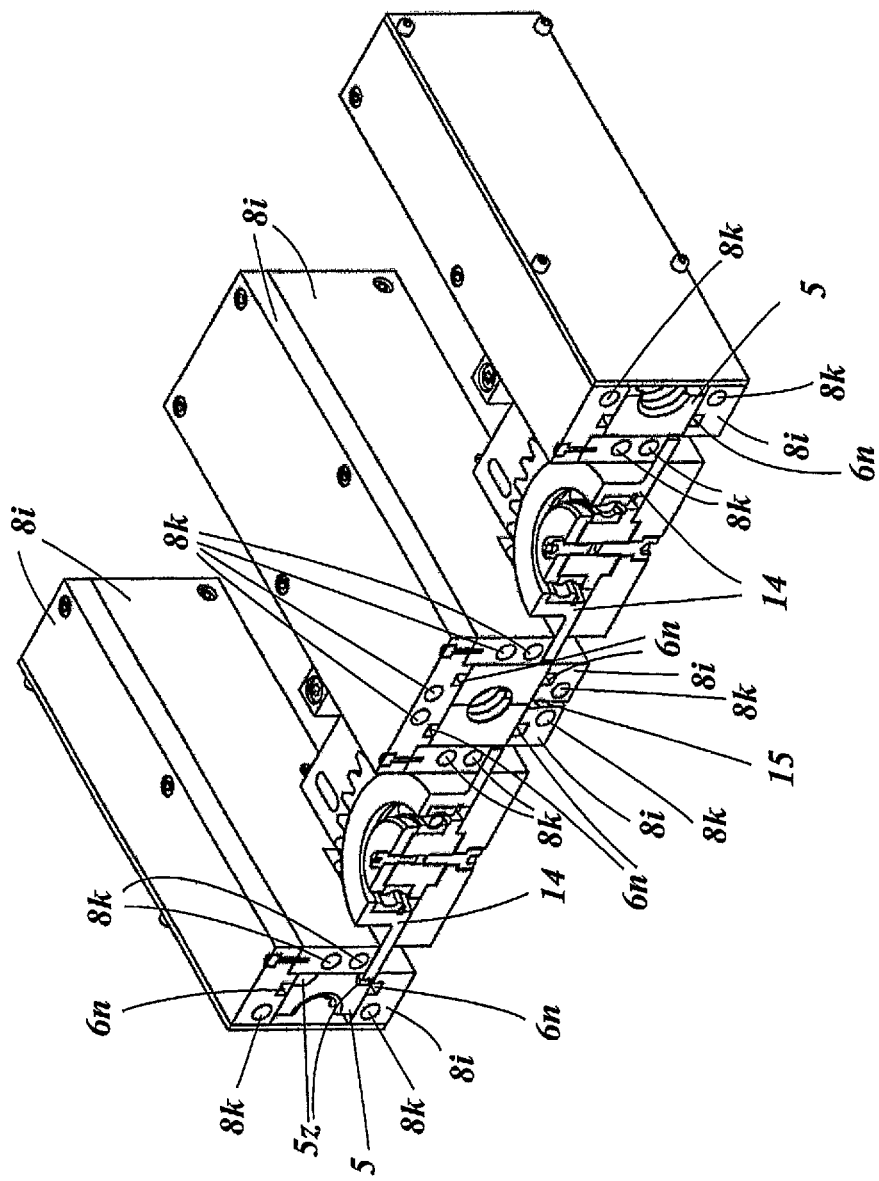
Figure 13:
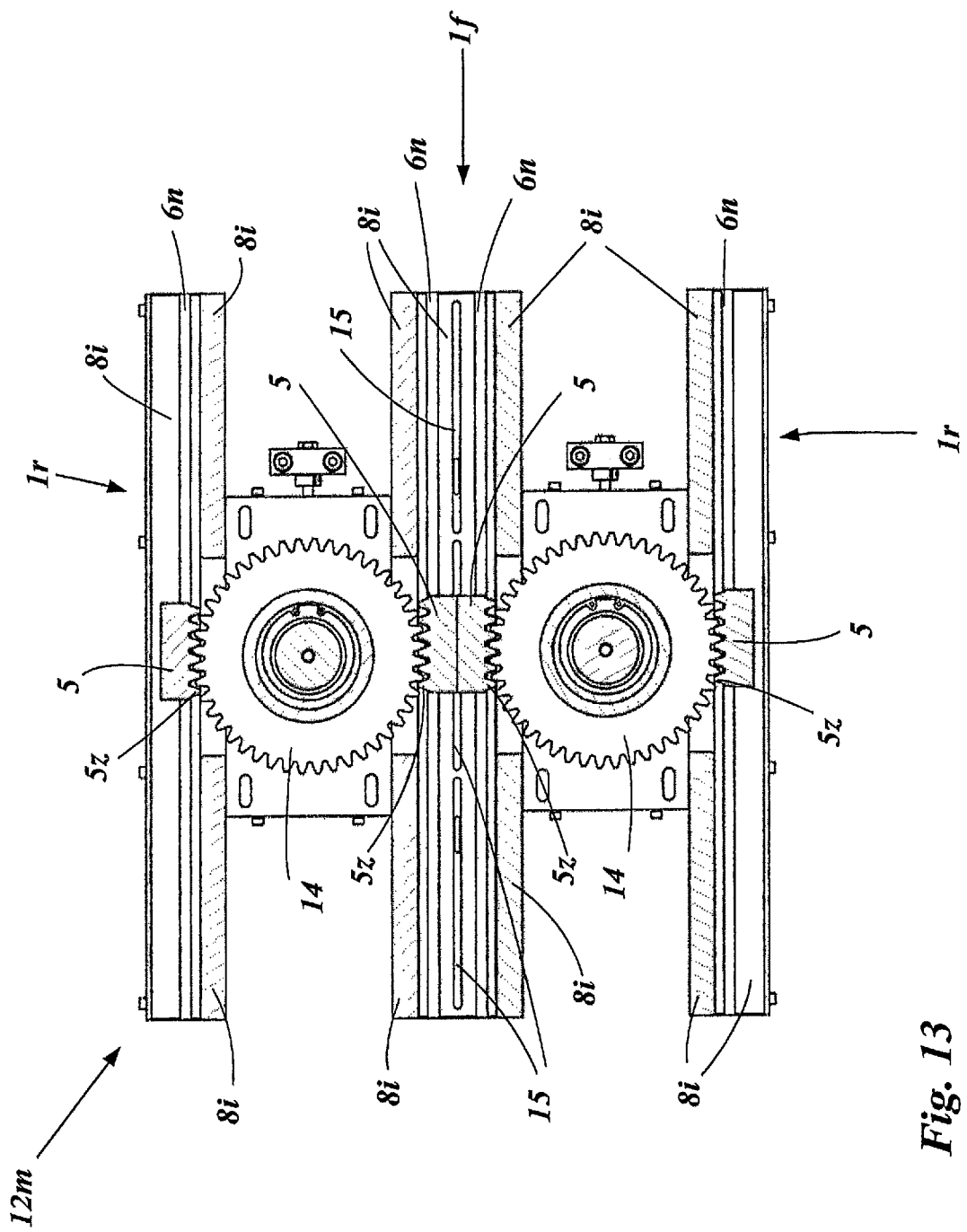

It can be provided that the connection apparatus is arranged securely on the molding jaw, and is formed as a sliding connection apparatus. The invention is now explained in more detail with reference to embodiment examples. There are shown in:

FIG. 1 an embodiment example of a device according to the invention for producing plastic pipes in a schematic top view;

FIG. 2 a corrugator of the device in FIG. 1 in a perspective representation;

FIG. 3 a molding jaw pair of the device in FIG. 1 in a perspective representation;

FIG. 4 a detail of an inlet section of the device in FIG. 1 in a perspective representation;

FIG. 5 the intermediate section of the device in FIG. 1 with the molding sections and the return guides in a sectional representation;

FIG. 6 a coupling module with temperature-control medium channel bypass in a perspective sectional representation;

FIG. 7 a second embodiment example of a device according to the invention for producing plastic pipes in a perspective representation;

FIG. 8 the intermediate section of the device in FIG. 7 with the molding sections and the return guides in a sectional representation;

FIG. 9 a molding jaw pair of the device in FIG. 7 in a perspective representation;

FIG. 10 an inlet section of the device in FIG. 7 in a perspective representation;

FIG. 11 the clearance-compensation module in the intermediate section of the device in FIG. 7 with the molding sections and the return guides in a sectional representation;

FIG. 12 the clearance-compensation module in the intermediate section of the device in FIG. 7 with the molding sections and the return guides in a perspective sectional representation;

FIG. 13 the clearance-compensation module in the intermediate section of the device in FIG. 7 with the molding sections and the return guides in a sectional representation from above.

FIG. 1 shows a device for producing plastic pipes 10, with an extruder 9 with a die head 9s and a corrugator 1. A molten plastic tube is introduced into the corrugator by means of the die head 9s in order to mold a plastic pipe 10.

The corrugator 1 has a molding section 1f, in which molding jaws 5 are guided in pairs (see FIG. 3) in the production direction.

In an inlet section 1e of the corrugator 1, the molding jaws 5 are brought together to form molding jaw pairs towards the start of the molding section 1f in an inlet module 2e.

In an outlet section 1a of the corrugator 1, the molding jaw pairs are moved apart from each other from the end of the molding section 1f in an outlet module 2a.

The molding section 1f is formed as a molding section module 2f in an intermediate section 1z of the corrugator 5 arranged between the inlet section 1e and the outlet section 1a. Furthermore, in the intermediate section 1z, on both sides of the molding section 1f, in each case a return guide 1r is formed, namely a return guide 1r for the left-hand molding jaws and a return guide 1r for the right-hand molding jaws. In the return guides 1r, the molding jaws 5 are returned from the end of the molding section 1f to the start of the molding section 1f. The return guides 1r, 1 r are formed as two separate return guide modules 2r, 2r. They are arranged parallel to each other. The molding section module 2f is arranged in between.

The molding jaw pairs arranged one behind another lie one on another edge to edge on the end face in the molding section 1f and, with their molding surfaces, form the molding channel. The molding channel is formed as a cylindrical cavity, in which the plastic pipe is formed by cooling of the molten plastic tube. A molding jaw pair comprises two molding jaws 5 formed in mirror image, the molding surfaces 5f of which (see FIG. 3) form the negative mold for the plastic pipe 10 formed in the device. To produce corrugated plastic pipes, the molding surfaces 5f are corrugated. The molding surfaces 5f of the molding jaw pairs arranged edge to edge in the molding section 1f form a continuous molding channel.

The extruder 9 represented only schematically in FIG. 1 has a nozzle-type die head 9s, the outlet opening of which is arranged at the inlet of the molding section. The molten plastic tube is injected into the molding section of the corrugator by means of the die head 9s. By means of corresponding pressure control, the pressures acting on the inner side and on the outer side of the molten plastic tube in the molding section 1f are controlled. Depending on the formation of the nozzle apparatus of the die head 9s, single- and multi-walled plastic pipes can be produced.

The molding jaws 5 are guided in a stationary guiding apparatus 6. As can be recognized in FIGS. 5 and 6 in conjunction with FIG. 2, in the embodiment example represented the guiding apparatus 6 is formed by guide and/or temperature-control element apparatuses 8 which are supported in a fixed manner on cross beams 1q. Temperature-control medium channels 8k through which a temperature-control medium flows are formed in the guide and/or temperature-control element apparatuses 8. The guide and/or temperature-control element apparatuses 8 are composed of guide and/or temperature-control elements 8i. The guide and/or temperature-control elements 8i are arranged such that they enclose the molding jaws 5 passing through from above, from below and from the side. The guide and/or temperature-control elements 8i have guide and/or temperature-control surfaces 8f, sliding against which the molding jaws 5 passing through are guided (see FIG. 5). The guide and/or temperature-control surfaces 8f are formed to complement the outer side of the molding jaws. In the guide and/or temperature-control surfaces 8f, guide grooves 6n, 8nz, 8ne are formed, in which guide pins 5s or, in the case of modified embodiments, other protrusions of the molding jaws 5 engage. The guide and/or temperature-control elements 8i thus form temperature-control elements for controlling the temperature of the molding jaws 5 and at the same time they form guide elements, in or against which the molding jaws 5 are guided. The molding surfaces 5f of the molding jaws 5 are temperature-controlled indirectly, i.e. cooled as a rule, by the temperature-control medium, which flows through the temperature-control medium channels 8k of the guide and/or temperature-control elements 8i. However, applications in which the temperature of the temperature-control medium is set such that a heating of the molding jaws is effected by the guide and/or temperature-control element apparatus 8 at least in particular sections of the corrugator are also possible. FIG. 5 shows a cross section through the intermediate section 1z. The molding section 1f is recognizable in the center and a return guide 1r is recognizable on each of the two sides. The guide and/or temperature-control elements 8i are formed from elongate base bodies, in each of which two temperature-control medium channels 8k are arranged. The temperature-control medium channels 8k run along the direction of the longitudinal extent of the guide and/or temperature-control elements 8i. A temperature-control medium flows through the temperature-control medium channels 8k. The molding jaws 5 pass through the guide and/or temperature-control elements 8i along the direction of the longitudinal extent of the guide and/or temperature-control elements 8i. The temperature-control medium channels 8k extend in the guiding direction.

For guidance and temperature control, the guide and/or temperature-control elements 8i interact, as already described, with the molding jaws 5 passing through. For this, the guide and/or temperature-control elements 8i have the guide and/or temperature-control surfaces 8f, which interact with guide and/or temperature-control surfaces of the molding jaws 5. In the embodiment example represented, the guide and/or temperature-control surfaces 8f on the guide and temperature-control element side are formed on the side of the guide and/or temperature-control elements 8i facing the assigned molding jaws 5. The guide and/or temperature-control surfaces on the molding jaw side are formed on the outer side of the molding jaws 5. On the side of the molding jaws 5 facing away therefrom, the molding surfaces 5f are formed, which are to achieve as uniform as possible a temperature distribution over the entire surface.

As FIG. 5 shows, the guide and/or temperature-control elements 8i are formed in the molding section module 2f such that the molding jaw pairs are surrounded by the guide and/or temperature-control elements 8i. As can be seen from FIG. 5, in the molding section, four guide and/or temperature-control elements 8i surround the molding jaw pairs on all four longitudinal sides, in that two lateral guide and/or temperature-control elements 8i are in thermal contact with the side surfaces of the molding jaw pairs and two guide and/or temperature-control elements 8i are in thermal contact with the top side and, respectively, with the underside of the molding jaw pairs. The guide and/or temperature-control elements 8i arranged in the return guide modules 2r are formed like the above-named guide and/or temperature-control elements 8i, but with the difference that the molding jaws 5 in the return guides 1r are enclosed only on three longitudinal sides by the guide and/or temperature-control elements 8i, wherein the open sides of the molding jaws 5 have the molding surfaces 5f, which are thus not covered.

For the primary guidance of the molding jaws 5, as already described, grooves 8nz, 8ne are formed in the upper and lower guide and/or temperature-control surfaces 8f, in which the upper and lower guide pins 5s of the molding jaws 5 engage. In preferred embodiments, the guide pins 5s are formed with a diameter smaller than 14 mm. The grooves 8nz for guiding the guide pins 5s are formed, as represented in FIG. 5, by guide and/or temperature-control elements 8i adjoining each other, i.e. groove-shaped crevices are formed between the adjoining guide and temperature-control elements 8i, which form the guide grooves 8nz. Furthermore, guide grooves 8ne are also formed laterally as one-piece grooves in the guide and/or temperature-control elements 8i. In the embodiment example represented, the toothed strips 5z of the molding jaws 5 engage in these grooves 8ne. A guidance of the molding jaws 5 is also achieved thereby.

The size of the area of contact between the guide and/or temperature-control elements 8i and the molding jaws 5 is influenced by these guide structures that engage in each other, i.e. the toothed strips 5z, the guide pins 6n and/or similar depressions and elevations that further engage in each other, and the heat transfer is at least determined with it.

With reference to FIG. 4, further guide grooves may also be mentioned. These are formed as lower and upper guide grooves 6n in the inlet module 2e and in the outlet module 2a. The guide pins 5s of the molding jaws engage in these grooves 6n, forming the guidance in the deflection area of the inlet section 1e and of the outlet section 1a.

The guiding apparatus for guiding the molding jaws is thus a composite apparatus, composed of the guidance through the guide and/or temperature-control element apparatuses 8 (see FIG. 5) and the guidance in the deflection areas in the inlet section 1e and in the outlet section 1a.

The guide grooves 6n, 8nz, 8ne of the guiding apparatuses 6, 8, 8i are formed as endless, i.e. in each case continuous, guide grooves 6n, in which the guide pins 5s arranged on the molding jaws 5 slide in the sense of an endless circuit. The molding jaws 5 in the case represented each have an upper and a lower guide pin 5s, which are arranged on opposite end sections of the molding jaw 5 in each case on the top side and, respectively, on the underside of the molding jaw 5. Accordingly, two upper guide grooves 6n, 8nz, 8ne and two lower guide grooves 6n, 8nz, 8ne are formed in the respective guide and/or temperature-control elements 8i and in the deflection areas of the inlet and outlet sections 1e, 1a. The upper and the lower guide grooves have different geometries, wherein the guide tracks defined by the guide grooves are formed such that the molding jaws 5 perform a pivoting movement in the curve sections of the guide tracks (see FIG. 4), such as is necessary in the deflection areas of the inlet and outlet sections. Curve abrasion is minimized by the pivoting movement. In the embodiment example represented in FIG. 3, the guide pins 5s are rigidly connected to the molding jaws 5, for example by means of a press-fit connection. However, it can also be provided to mount the guide pins 5s rotatably, for example in slide bearings, whereby the said curve abrasion is reduced still further.

The molding jaws 5 in the case represented each have two toothed strips 5z, which interact in the inlet module 2e and in the outlet module 2a with deflection pinions 11, as shown in FIG. 4. The teeth are not represented in FIG. 4.

Like FIG. 2, in the embodiment example represented the modules arranged in the intermediate section 1z, namely the molding section module 2f and the two return guide modules 2r, are in each case formed from two partial modules. Plate-shaped coupling apparatuses 3 are provided to connect neighboring modules. The coupling apparatuses 3 are detachably connected to the modules by screw connections. The molding section modules 2f are coupled to each other at the end faces by the plate-shaped coupling apparatuses 3. Likewise, the return guide modules 2r are coupled to each other at the end faces by coupling apparatuses 3. Coupling apparatuses 3 are likewise arranged in the connecting areas in order to couple the inlet module 2e and the outlet module 2a to the molding section modules 2f and the return guide modules 2r.

Temperature-control channel diversions 8u are provided in the coupling modules 3 to connect the temperature-control channels 8k of neighboring modules. Reference may be made to FIG. 6. The temperature-control channel bypasses 8u have U-shaped bypass channels 8k, the end sections of which correspond to blind holes which engage perpendicularly through the side wall of the guide and/or temperature-control elements 8i of the modules and open into the temperature-control medium channels 8k.

The guiding apparatus 6 in the intermediate section 1z is formed, as already described, by the guide and/or temperature-control element apparatus 8. This is arranged on a base frame, as FIGS. 2 and 5 show. The base frame in the case represented in FIG. 2 consists of several base frame parts spaced apart from each other, cross beams 1q in the case represented. The inlet module 2e is arranged on a bearing plate of its own, wherein the bearing plate is supported on two cross beams 1q. The outlet module 2a is arranged on two cross beams 1q that are spaced apart from each other. The inlet module 2e and the outlet module 2a are coupled to a module of the intermediate section 1z in the connecting areas by a cross beam 1q in each case. The modules of the intermediate section 1z are coupled to each other by a cross beam 1q one below another in the connecting areas. The cross beams 1q contain channel connections with U-shaped channels for connecting the temperature-control channels of the modules. In a modified embodiment example, it is also possible for the lower temperature-control channels 8k of the modules to be coupled to each other by coupling apparatuses 3 and for the coupling apparatuses 3 to be arranged on the cross beams 1q.

FIGS. 7 to 13 show a second embodiment example of the device according to the invention for producing plastic pipes 10. In contrast to the above-described embodiment, the molding section 1f, the inlet section 1e, the outlet section 1a and the return guide 1r are mounted on a common base plate 1g (see FIGS. 7 and 8). The molding section 1f, as well as the return guide 1r, is composed of several molding section modules 2f and return guide modules 2r, as shown in FIG. 7. In addition, a clearance-compensation module 12m is arranged in the molding section 1f and the return guide 1r.

As shown in FIGS. 7 and 8, in this embodiment example according to the invention the temperature-control channels 8k of the molding section modules 2f and of the return guide modules 2r are not connected to each other by means of coupling apparatuses 3. The molding section modules 2f and return guide modules 2r in this embodiment example in each case lie one on another edge to edge. The temperature-control channels 8k between the modules are sealed by seals.

The molding jaws 5 in the embodiment example of FIGS. 7 to 13 differ from the above-described molding jaws 5 only in that the toothed strips 5z are formed lying inside the body of the molding jaws 5 (see FIG. 9). The toothed strips 5z thereby do not protrude laterally beyond the base body of the molding jaws 5. The side surfaces of the molding jaws 5, which interact with the guide and temperature-control surfaces 8f, as described above, can thereby be produced lighter and more precise. The inwardly lying toothed strips 5z on the outer side of the molding jaws 5 are formed on the upper and lower areas of the molding jaws. A homogeneous and precise forward movement of the molding jaws 5 can be achieved by the double arrangement of the toothed strips 5z and the correspondingly doubly formed drive pinions 13 (see FIG. 10).

As shown in FIG. 10, in this embodiment example two drive pinions 13 for the slide drive of the left-hand and right-hand molding jaws 5 are formed in the inlet module 2e. In each case a drive pinion 13 is formed by two toothed wheels arranged one above another, wherein the toothed wheels are connected to each other by means of a drive shaft. The drive pinions 13 engage, with their teeth, in the inwardly lying toothed strip 5z of the molding jaws 5 and move the molding jaws 5 in the production direction. As shown in FIG. 10, the drive pinions 13 in this embodiment example also serve to deflect the molding jaws 5, analogously to FIGS. 1 and 4.

The molding section 1f, which is formed as a guiding apparatus of the molding jaw pairs running in the production direction through guide and/or temperature-control elements 8i, in the embodiment example of FIGS. 7 to 13 is formed by four guide and/or temperature-control elements 8i (see FIGS. 8 and 11). A guide and/or temperature-control element 8i lie on the base plate 1g and, with their upper side, form the bottom surface of the molding section. The side surfaces of the molding section 1f are formed by two guide and/or temperature-control elements 8i, which are arranged upright on the base plate 1g and are screwed to the latter. As a top surface of the molding section 1f, a fourth guide and/or temperature-control element 8i is arranged, which is screwed to the lateral guide and/or temperature-control elements 8i. The bottom surface, the two side surfaces and the top surface of the molding section 1f each form temperature-control and guide surfaces 8f for the molding jaw pairs 5, 5 guided in the molding section.

In each of the four guide and/or temperature-control elements 8i of the molding section 1f, two temperature-control channels 8k are formed, which run through the guide and/or temperature-control elements 8i in the longitudinal direction. Through the four-sided arrangement of the temperature-control channels 8k, a uniform cooling of the plastic pipe 10 formed in the molding channel can be achieved. Guide grooves 6n, 8nz, 8ne for guiding the molding jaws 5 are formed in the bottom surface and the top surface of the molding section 1f. The guide pins 5s of the molding jaws 5 engage in the guide grooves 6n, 8nz, 8ne and guarantee a precise guidance.

As guide and/or temperature-control elements 8i in the inlet section 1e and in the outlet section 1a, in each case a bottom plate 8b and in each case a top plate 8d are provided. A guide and/or temperature-control element 8i, which extends in the direction of the molding section 1f, is arranged between these two plates. Cooling channels are formed in the plates 8b and 8d and in the guide and/or temperature-control elements 8i arranged in between. The channels in the bottom plate 8b and in the top plate 8d each form a branched channel network with channel sections which run in the production direction and channel sections which run in the return-guide direction and transverse connecting channels. In addition, connecting channels, which connect the channel network of the bottom plate to the channel network of the top plate, run through the guide and/or temperature-control elements 8i lying between these two plates.

The supply to the cooling channels is effected by means of a left-hand and a right-hand water circuit. The left-hand and the right-hand water circuit in each case supplies the inlet section, the outlet section and the molding section. The circuit here runs through the cooling channels in the return guide first and then through the cooling channels in the molding section. The bypass is effected in the channel system in the outlet area. In the inlet area, the feed is effected divided into the four planes, namely into the upper plane in which the upper guide and/or temperature-control elements 8i and the top plate 8d are arranged, a lower plane in which the lower guide and/or temperature-control elements 8i and the bottom plate 8b are arranged, and two parallel planes lying in between in which the two cooling channels 8k, lying one above another, of the lateral guide and/or temperature-control elements 8i are arranged.

As shown in FIGS. 9 to 13, vacuum zones 15 are formed in the guide and/or temperature-control elements 8i, which form the bottom surface of the molding section 1f. In the inlet section 1e and in the outlet section 1a, the vacuum zones 15 are formed in the bottom plate 8b of the inlet section 1e and, respectively, of the outlet section 1a (see FIG. 10). The vacuum zones 15 consist of several through-slots which completely engage through the guide and/or temperature-control elements 8i arranged in the molding section and engage through the bottom plate 8b in the inlet section 1e and in the outlet section 1a. The through-slots are arranged flush one behind another in the production direction and spaced apart from each other and centrally, i.e. arranged in a line flush with the longitudinal center line of the molding section. The vacuum zones 15 formed as through-slots are connected to an external vacuum supply system, not represented, which in the embodiment example represented is arranged on the underside of the base plate 1g. For this, the base plate 1g has bores, which open into the vacuum zones 15 formed as through-slots. In the molding jaws 5, vacuum channels are formed which, with their inner ends, open into the molding surface and, with their outer ends, form a sliding connection to the vacuum zones, while the molding jaws 5 run over the bottom section.

The return guide 1r, which is formed by guide and/or temperature-control elements 8i, in the embodiment example of FIGS. 7 to 13 is formed by three temperature-control elements 8i (see FIGS. 8 and 11). A temperature-control element 8i lies on the base plate 1g and forms the bottom surface of the temperature-control and guide surface 8f of the return guide 1r. The left-hand and the right-hand side surface of the return guide 1r is in each case formed by a guide and/or temperature-control element 8i, which is arranged upright on the base plate and is screwed to the latter. As a top surface of the molding section 1f, a third guide and/or temperature-control element 8i is arranged, which is screwed to the lateral guide and/or temperature-control elements 8i. The outer side of the return guide 1r is covered with a cover and thereby protects the molding jaws 5 from dirt. Embodiments in which the outer side is left open are also possible. In all three guide and/or temperature-control elements 8i, two temperature-control channels 8k are formed, which run through the guide and/or temperature-control elements 8i in the longitudinal direction.

As shown in FIGS. 7, 8 and 11 to 13, in the second embodiment example according to the invention a clearance-compensation module 12m is arranged. This clearance-compensation module 12m consists of a left-hand part and a right-hand part, each of which is composed of a return guide and a molding section and a clearance-compensation pinion 14. A clearance-compensation pinion 14 engages in the assigned lower internal toothed strip 5z of the molding jaws 5 in the molding section 1f and engages in the return guide 1r. For this, the lateral guide and/or temperature-control elements 8i of the molding section 1f and of the return guide 1r have openings for the clearance-compensation pinion 14 to engage through (see FIGS. 11 to 13). The openings in the lateral guide and/or temperature-control elements 8i are arranged such that the temperature-control channels 8k in the lateral guide and/or temperature-control elements 8i are reached from below.

The clearance-compensation pinion 14 is driven by the movement of the molding jaws 5 in the molding section 1f in the production direction. The section of the path that the molding jaws 5 run through from the clearance-compensation module 12m in the molding section 1f via the outlet section 1a to the clearance-compensation module 12m in the return guide 1r is dimensioned precisely such that the clearance-compensation pinion 14 runs slightly ahead of the returning molding jaws 5 and, as soon as a tooth of the clearance-compensation pinion 14 engages in a returning molding jaw 5, it pulls this molding jaw 5 in the return travel direction (movement direction of the molding jaws in the return guide 1r). In the case of cold molding jaws 5, a clearance compensation thereby forms between the pulled molding jaw 5 and the molding jaw 5 lying behind it, which the clearance-compensation module 12m has not yet reached. This clearance compensation is provided in order to compensate for the change in length of the molding jaws 5 in the event of a temperature change.

A second clearance compensation forms on the inlet module in front of the drive pinion. The section of the path of the molding jaws 5 from the clearance-compensation module 12m in the return guide 1r to the drive pinion 13 of the inlet module 2e is formed precisely such that the drive pinion 13 runs ahead of the incoming molding jaw 5 and, as soon as a tooth of the drive pinion 13 engages in a returning molding jaw 5, pulls it in the production direction in the inlet section 1e. This second clearance compensation is provided in order to prevent a jamming of the molding jaws in the guiding apparatus 6 at high temperatures.

LIST OF REFERENCE NUMBERS 1 corrugator
1a outlet section
1e inlet section
1f molding section
1r return guide
1q cross beam
1z intermediate section
2a outlet module
2e inlet module
2f molding section module
2r return guide module
3 coupling apparatus
5 molding jaws
5f molding surface
5s guide pins
5z toothed strips
6 stationary guiding apparatus
6n, 8nz, 8ne guide groove;
8 guide and/or temperature-control element apparatus
8i guide and/or temperature-control element
8k temperature-control channel
8u temperature-control channel bypass
8f temperature-control surface
8b bottom plate
8d top plate
9 extruder
9f molding-air supply
9s die head
10 plastic pipe
11 deflection pinion
12 clearance compensation
12m clearance-compensation module
13 drive pinion
14 clearance-compensation pinion
15 vacuum zone

The invention claimed is:

1. A device for producing plastic pipes, the device comprising:
   an extruder with a die head and a corrugator, into which a molten plastic tube is introduced by means of the die head in order to mold the plastic pipe, wherein
   the corrugator has a molding section, in which molding jaws are guided in pairs in a production direction,
   in an inlet section of the corrugator, the molding jaws are brought together to form molding jaw pairs towards the start of the molding section,
   in an outlet section of the corrugator, the molding jaw pairs are moved apart from each other from the end of the molding section, and
   in an intermediate section of the corrugator arranged between the inlet section and the outlet section, the molding section is formed to guide the molding jaw pairs and at least one return guide is formed in which the molding jaws are returned from the end of the molding section to the start of the molding section; and
   a stationary guiding apparatus for guiding the molding jaws in at least one of the molding section or the return guide, wherein
   a) the guiding apparatus has at least one of a guide apparatus or temperature-control element apparatus,
   b) the at least one of the guide apparatus or the temperature-control element apparatus has a temperature-control medium channel apparatus through which temperature-control medium can flow,
   c) the at least one of the guide apparatus or the temperature-control element apparatus has at least one of a guide surface apparatus or temperature-control surface apparatus, which faces an outer side of the molding jaws passing through, transferring heat,
   d) in the at least one of the guide surface apparatus or the temperature-control surface apparatus of the at least one of the guide apparatus or the temperature-control element apparatus, guide recesses having at least one of elevations, depressions or flat guide surfaces are formed which interact with at least one of corresponding guide recesses or guide surfaces of the molding jaws passing through, and
   e) the at least one of the guide apparatus or the temperature-control element apparatus is formed such that at least one of the molding jaw pairs passing through in the molding section or given ones of the molding jaws passing through in the return guide are at least partially covered on an outer side of each molding jaw, wherein each of the molding jaws has two guide pins for engaging in guide grooves of a deflection area of the stationary guiding apparatus and has toothed strips, the toothed strips formed so that they are arranged on corners of the molding jaw pairs, and the molding jaw pairs having a rectangular cross-section with a toothed strip at each of its four corners.

2. The device according to claim 1, wherein guide formations, having at least one of or depressions, of the at least one of the guide apparatus or the temperature-control element apparatus are formed as at least one of guide pins, guide lugs, guide depressions or guide grooves; and guide formations, having at least one of elevations or depressions, of the molding jaws correspond to the guide formations of the at least one of the guide apparatus or the temperature-control element apparatus.

3. The device according to claim 1, wherein the temperature-control medium channel apparatus has parallel temperature-control medium channels which extend through the at least one of the guide apparatus or the temperature-control element apparatus.

4. The device according to claim 3, wherein in each case at least one given temperature-control medium channel is formed in at least one of each guide element or temperature-control element of the at least one of the guide apparatus or the temperature-control element apparatus.

5. The device according to claim 4, wherein a plurality of parallel temperature-control medium channels are formed in the at least one of the guide element or the temperature-control element.

6. The device according to claim 4, wherein over an axial course thereof, the at least one given temperature-control medium channel has a constant cross section or has a varying cross section.

7. The device according to claim 6, wherein at least one of axially neighboring guide elements or a temperature-control elements are arranged edge to edge and have a coupling apparatus, which has a connecting channel for temperature-control medium, by means of which the at least one given temperature-control medium channel of at least one given guide element or one given temperature-control element can be connected to the at least one given temperature-control medium channel of the other temperature-control element.

8. The device according to claim 7, wherein the coupling apparatus is formed as a plate-shaped body, in which the connecting channel for temperature-control medium is formed.

9. The device according to claim 1, wherein the temperature-control medium channel apparatus is arranged and designed in the at least one the guide apparatus or temperature-control element apparatus in such a way that a molding surface of at least a given one of the molding jaws or the molding jaw pairs passing through achieves a uniform temperature distribution over an entirety of the molding surface.

10. The device according to claim 1, wherein the at least one of the guide apparatus or the temperature-control element apparatus is arranged in the molding section on an upper outer side of the molding jaw pairs passing through and on a lower outer side of the molding jaw pairs passing through and on one lateral outer side and on another lateral outer side of the molding jaw pairs passing through, and thereby covers the molding jaw pairs passing through on four longitudinal sides.

11. The device according to claim 1, wherein the at least one of the guide apparatus or the temperature-control element apparatus is arranged in the return guide of the molding jaws on an upper outer side of the molding jaws and on a lower outer side of the molding jaws and is arranged on a lateral outer side of the molding jaws which is arranged facing away from the molding surface of the respective molding jaws, thereby covering the molding jaws only on three sides.

12. The device according to claim 1, wherein the at least one of the guide apparatus or the temperature-control element apparatus is formed from at least one of a plurality of guide elements or temperature-control elements, which surround the molding jaw pairs passing through on several sides.

13. The device according to claim 1, wherein at least one of a guide element or a temperature-control element is arranged on at least one of an upper outer side of the molding jaw pairs passing through in the molding section, a lower outer side of the molding jaw pairs passing through in the molding section, one lateral outer side of the molding jaw pairs passing through in the molding section, or another lateral outer side of the molding jaw pairs passing through in the molding section.

14. The device according to claim 1, wherein the at least one of the guide apparatus or the temperature-control element apparatus is formed from at least one of a plurality of guide or temperature-control elements arranged axially one behind another edge to edge in a guiding direction, or at least one of several guide elements or temperature-control elements arranged next to each other transverse to the guiding direction.

15. The device according to claim 1, wherein each of at least one of guide element or temperature-control element respectively has at least one of a guide surface or temperature-control surface on at least one of a side facing the given ones of the molding jaws passing through or the molding jaw pairs passing through.

16. The device according to claim 1, wherein at least one of a guide surface or temperature-control surface of at least one of a guide element or temperature-control element has guide formations which are formed as at least one of guide elevations or guide depressions.

17. The device according to claim 16, wherein guide elevations on the molding jaws are formed as guide pins and at least one of the guide depressions on the at least one of the guide element or the temperature-control element are formed as guide grooves, in which the guide pins engage.

18. The device according to claim 16, wherein the at least one of the guide elevations or the guide depressions are formed in an area between two temperature-control elements neighboring each other in a transverse direction.

19. The device according to claim 1, wherein in an area of at least one of a guide element or a temperature-control element, a vacuum apparatus or a part of a vacuum apparatus is arranged, which is or can be connected to an external vacuum supply, and is formed on a connection apparatus of a vacuum channel apparatus formed in a given molding jaw of the molding jaws, which applies a vacuum to the molding surface of the given molding jaw guided in the molding section.

20. The device according to claim 19, wherein the vacuum apparatus or the part of the vacuum apparatus is formed at least one of (i) engaging through the at least one of the guide element or the temperature-control element, (ii) inside at least one of a given guide element or a given temperature-control element in an intermediate space between at least one of two adjoining guide elements or temperature-control elements; or (iii) at least one of adjoining a given guide element or a given temperature-control element.

21. The device according to claim 19, wherein the connection apparatus is arranged securely on the molding jaw, and is formed as a sliding connection apparatus.

22. The device according to claim 1, wherein the molding jaw pairs or the given ones of the molding jaws slide along flat against the at least one of the guide apparatus or the temperature-control element apparatus.

23. The device according to claim 1, wherein each molding jaw is defined by a base body and for each molding jaw the toothed strips do not protrude laterally beyond the base body of the molding jaw.

24. The device according to claim 1, wherein each molding jaw is defined by a base body and for each molding jaw the toothed strips protrude laterally beyond the base body of the molding jaw.

25. The device according to claim 1, wherein the guide pins are formed through rigid connection.

26. The device according to claim 1, further comprising two drive pinions in the inlet section, the drive pinions being operable to engage with the molding jaws and move the molding jaws.

27. The device according to claim 26, wherein each of the drive pinions comprises two toothed wheels.

* * * * *